(12) United States Patent
VanderVelde

(10) Patent No.: US 6,946,599 B2
(45) Date of Patent: *Sep. 20, 2005

(54) RACEWAY SYSTEM FOR OFFICE FURNITURE

(75) Inventor: Charles VanderVelde, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/847,826

(22) Filed: May 18, 2004

(65) Prior Publication Data

US 2004/0211584 A1 Oct. 28, 2004

Related U.S. Application Data

(63) Continuation of application No. 10/421,338, filed on Apr. 23, 2003, now Pat. No. 6,759,589.

(51) Int. Cl.⁷ ................................................ H02G 3/04
(52) U.S. Cl. ...................... 174/48; 174/68.3; 174/72 A; 174/135; 52/220.3; 439/207
(58) Field of Search ........................... 174/48, 49, 135, 174/60, 68.1, 68.3, 72 A, 96, 97; 220/3.2, 3.8; 439/207; 52/220.3, 220.7

(56) References Cited

U.S. PATENT DOCUMENTS

| | | |
|---|---|---|
| 4,124,324 A | 11/1978 | Augis et al. |
| 4,164,618 A | 8/1979 | Casasanta |
| 4,203,639 A | 5/1980 | VandenHoek et al. |
| 4,716,698 A | 1/1988 | Wilson et al. |
| 5,044,135 A | 9/1991 | Kroon et al. |
| 5,152,698 A | 10/1992 | Juhlin et al. |
| 5,161,580 A | 11/1992 | Klug |
| 5,209,035 A | 5/1993 | Hodges et al. |
| 5,300,731 A * | 4/1994 | DeBaratolo et al. .......... 174/48 |
| 5,341,615 A | 8/1994 | Hodges et al. |
| 5,362,923 A | 11/1994 | Newhouse et al. |
| 5,390,968 A * | 2/1995 | Favalora ..................... 285/179 |
| 5,394,658 A | 3/1995 | Schreiner et al. |
| 5,469,893 A | 11/1995 | Caveney et al. |
| 5,606,919 A | 3/1997 | Fox et al. |
| 5,753,855 A | 5/1998 | Nicoli et al. |
| 5,831,211 A | 11/1998 | Gartung et al. |
| 5,881,500 A | 3/1999 | Latino et al. |
| 5,918,433 A | 7/1999 | Reuter et al. |
| 5,923,753 A | 7/1999 | Haataja et al. |
| 5,942,724 A * | 8/1999 | Russo et al. ................... 174/48 |
| 6,002,089 A | 12/1999 | Hemingway et al. |
| 6,037,538 A | 3/2000 | Brooks |
| 6,218,612 B1 | 4/2001 | McKitrick et al. |
| 6,244,002 B1 | 6/2001 | Martin |
| 6,254,041 B1 | 7/2001 | Dufourg |
| 6,281,434 B1 * | 8/2001 | Gretz .......................... 174/48 |
| 6,282,854 B1 | 9/2001 | Vos et al. |
| 6,284,975 B1 * | 9/2001 | McCord et al. ........... 174/71 R |
| 6,342,675 B1 | 1/2002 | DeBartolo, Jr. et al. |
| 6,344,611 B2 | 2/2002 | Ewer et al. |
| 6,559,378 B1 | 5/2003 | Bernard |
| 2003/0213193 A1 | 11/2003 | Carroll et al. |

* cited by examiner

*Primary Examiner*—Dhiru R. Patel
(74) *Attorney, Agent, or Firm*—Robert A. McCann; Christopher S. Clancy

(57) ABSTRACT

A raceway system is disclosed. The raceway system includes a base cap mountable to a top surface of an office furniture panel, at least one horizontal raceway section positionable adjacent the base cap, at least one corner raceway section positionable adjacent the base cap, and a cover securable to the base cap. The base cap has at least one aperture for wiring to pass therethrough. The corner raceway section has a channel extending axially therethrough, and the corner raceway section allows the wiring to pass vertically through the aperture and the channel.

11 Claims, 21 Drawing Sheets

RACEWAY SYSTEM FOR OFFICE FURNITURE

CROSS-REFERENCE TO RELATED APPLICATIONS

This application is a continuation of U.S. application Ser. No. 10/421,338, filed Apr. 23, 2003, now U.S. Pat. No. 6,759,589.

BACKGROUND OF THE INVENTION

The present invention is directed to a raceway system for office furniture and, more particularly, to a raceway system that allows for the routing of wiring from atop office furniture panels down into corner outlets at desk or floor level.

Cable management systems are known in the raceway industry. One such system is disclosed in U.S. Pat. No. 5,831,211. The '211 patent discloses a raceway 34 comprising a series of cable channels 36 which mount to the top of most major partition panel configurations and associated cable channel caps 38 which mount on the cable channels 36 in various positions to accommodate the different partition panel configurations. However, none of the cable management systems, including the one disclosed in the '211 patent, provide a raceway system having a base cap including an aperture for routing wiring from atop office furniture panels down into corner outlets at desk or floor level.

SUMMARY OF THE INVENTION

It would be desirable to provide a raceway system that allows for the routing of wiring from atop office furniture panels down into corner outlets at desk or floor level.

It would also be desirable to provide a raceway system having a base cap including an aperture for routing wiring from atop office furniture panels down into corner outlets at desk or floor level.

A raceway system is disclosed. The raceway system includes a base cap mountable to a top surface of an office furniture panel, at least one horizontal raceway section positionable adjacent the base cap, at least one corner raceway section positionable adjacent the base cap, and a cover securable to the base cap. The base cap has at least one aperture for wiring to pass therethrough. The corner raceway section has a channel extending axially therethrough, and the corner raceway section allows the wiring to pass vertically through the aperture and the channel.

The base cap has one aperture for wiring to pass therethrough, and the base cap has four posts to control the wiring as the wiring passes through the channel. Preferably, the base cap has two apertures and six posts. More preferably, the base cap has four apertures and eight posts.

The base cap has two recessed areas for positioning two horizontal raceway sections therein. Preferably, the base cap has three recessed areas for positioning three horizontal raceway sections therein. More preferably, the base cap has four recessed areas for positioning four horizontal raceway sections therein.

Preferably, the base cap has a slot for receiving a screw to secure the base cap to the corner raceway section in a plurality of predetermined positions.

Preferably, the cover has three tabs for securing the cover to the base cap, and the cover has four breakouts to allow the wiring to pass through the cover on each of four sides. More preferably, the cover has four tabs.

Preferably, the corner raceway section has a grooved slot for receiving a screw therein, and the corner raceway section has two flanges for engaging a raceway cover or a faceplate.

The end cap assembly comprises an end cap and a bottom support. Preferably, the end cap has two retaining slots for securing the end cap to the corner raceway section, and the bottom support has a plurality of ribs for locating and securing the corner raceway section therein. Moreover, the bottom support has a cut out area to allow the wiring to pass therethrough.

Preferably, the raceway system includes two horizontal raceway sections. More preferably, the raceway system includes four horizontal raceway sections.

Preferably, the raceway system includes two corner raceway sections. More preferably, the raceway system includes four corner raceway sections.

DETAILED DESCRIPTION OF PREFERRED EMBODIMENTS

The illustrated embodiments of the invention are directed to a raceway system that allows for the routing of wiring from atop office furniture panels down into corner outlets at desk or floor level. FIGS. 1–12 are directed to a raceway system 30, FIGS. 13–17 are directed to a raceway system 130, and FIGS. 18–23 are directed to a raceway system 230.

Figure 1:
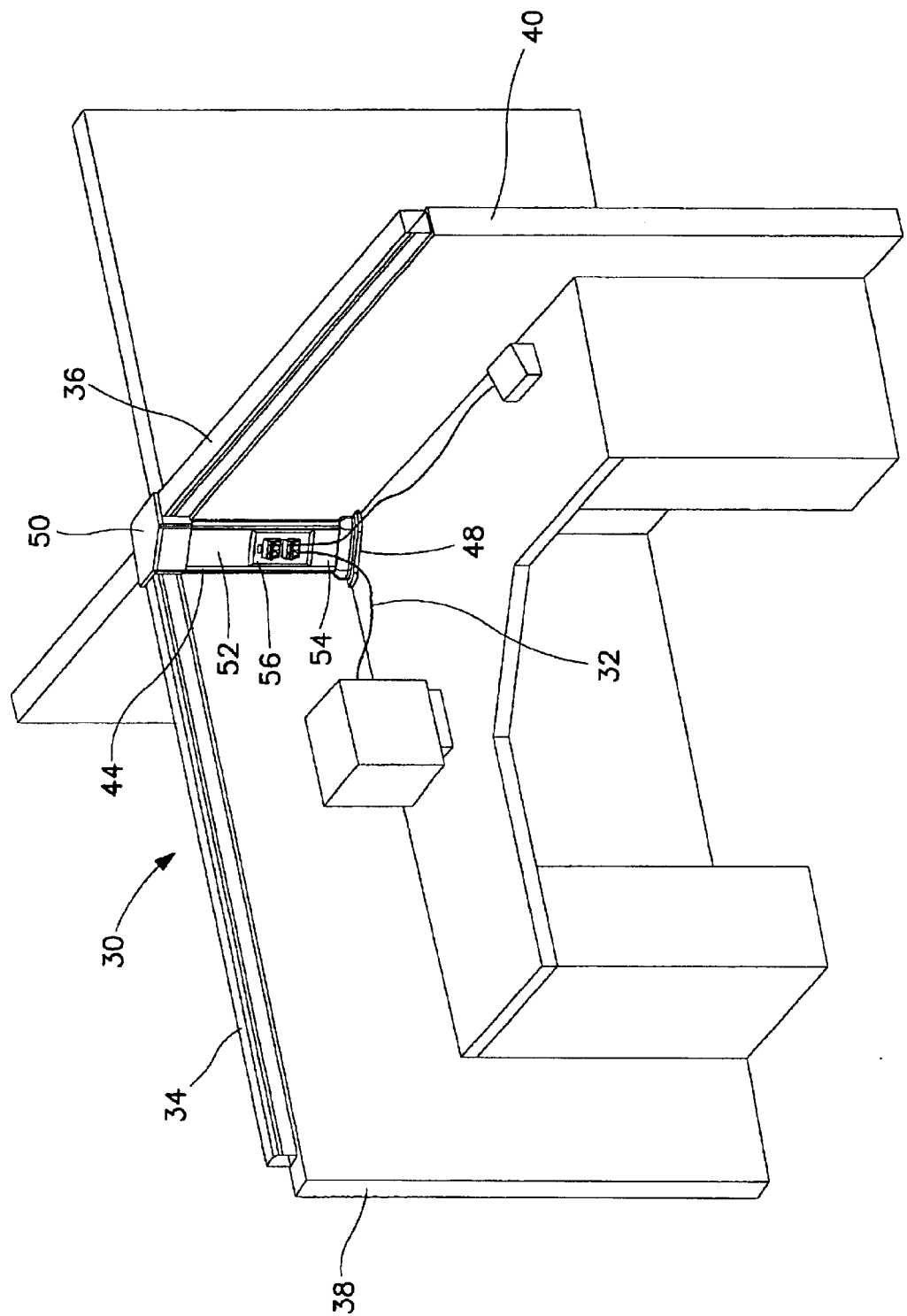
FIG. 1 is a fully assembled perspective view of a raceway system according to a first embodiment of the present invention.
Figure 3:
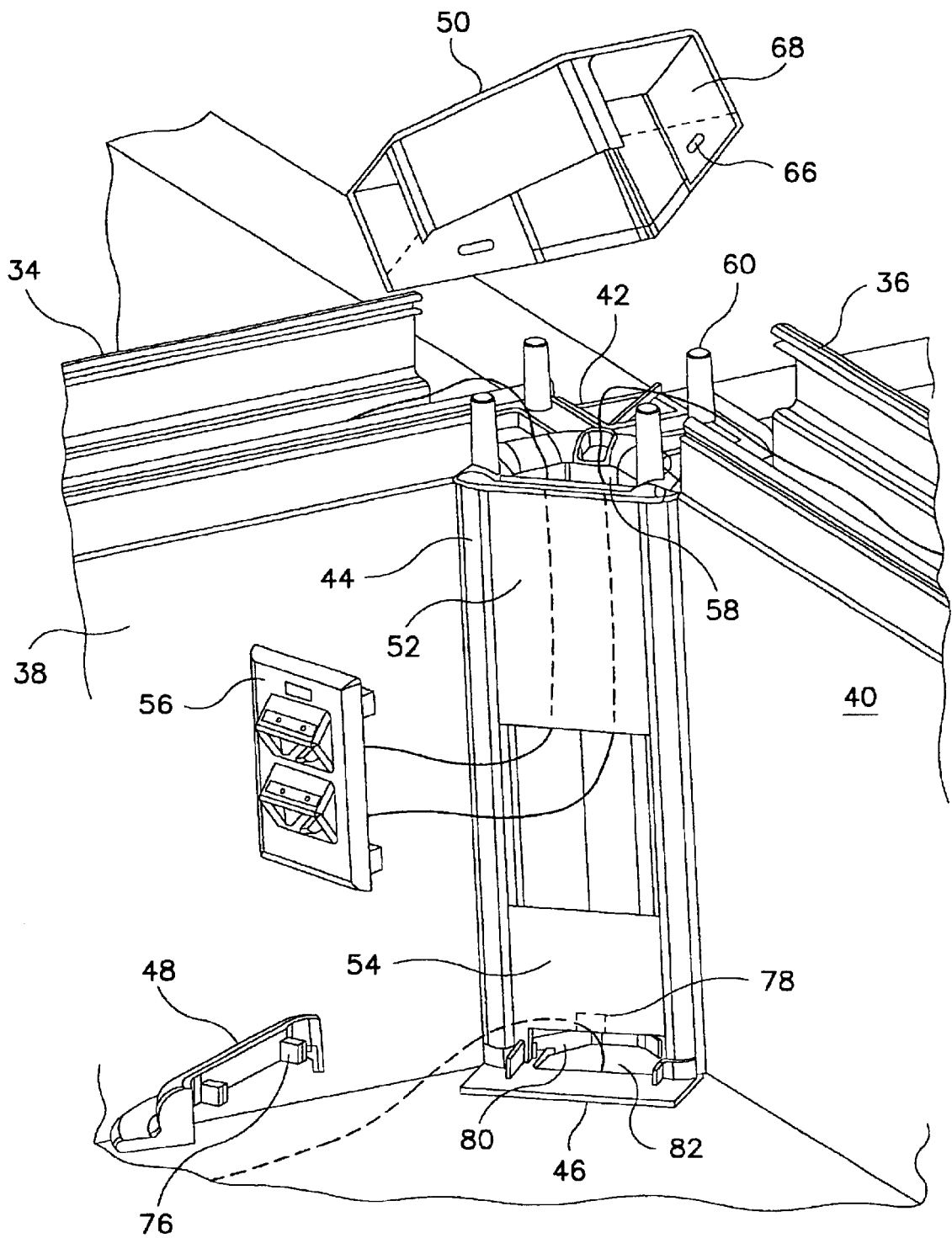
FIG. 3 is a partially exploded perspective view of the raceway system of FIG. 1.
Figure 4:
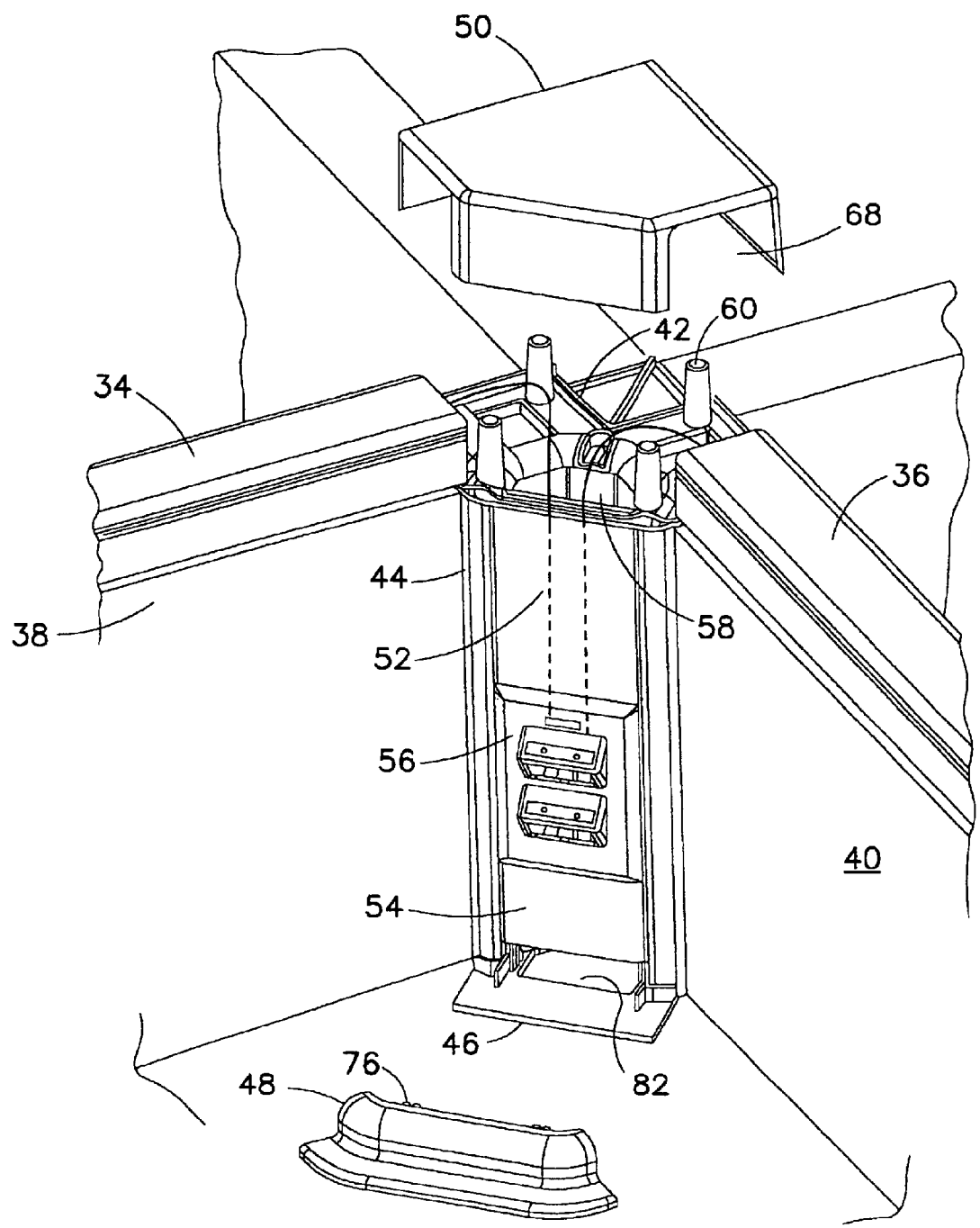
FIG. 4 is a partially exploded perspective view of the raceway system of FIG. 1.
Figure 5:
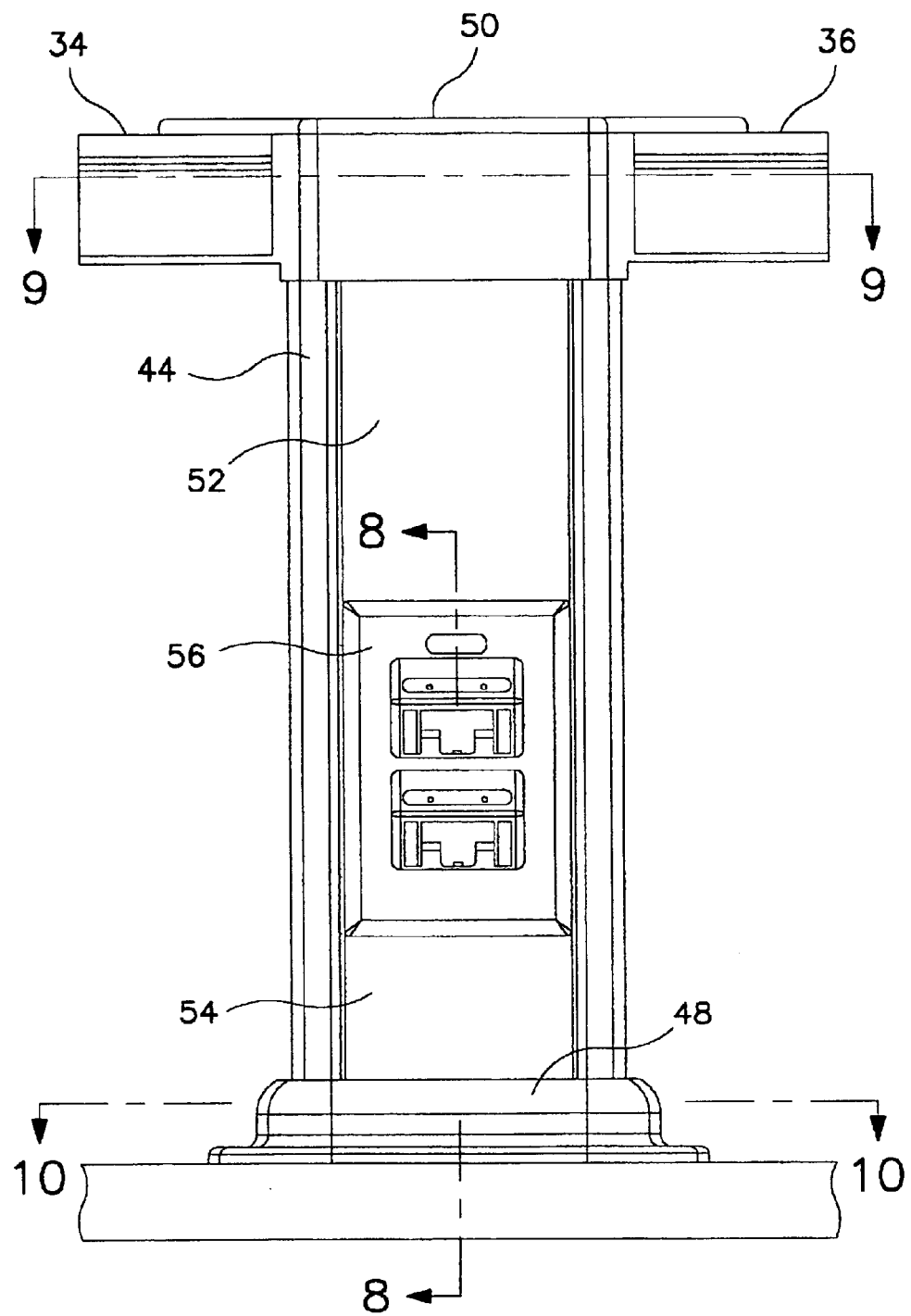
FIG. 5 is an enlarged front view of the raceway system of FIG. 1.

FIG. 1 shows a fully assembled raceway system 30. Raceway system 30 allows communication cabling, such as wires 32, from horizontal raceway sections, such as horizontal raceway sections 34, 36, to spill into the corners of office furniture panels, such as office furniture panels 38, 40. As shown in FIGS. 3 and 4, wires 32 pass vertically through an aperture in a base cap, such as base cap 42, and a channel of a corner raceway section, such as corner raceway section 44, and terminate at the desk or floor level into connector modules, such as a communication jack. As shown in FIG. 1, wires 32 terminate at the desk level.

Figure 2:
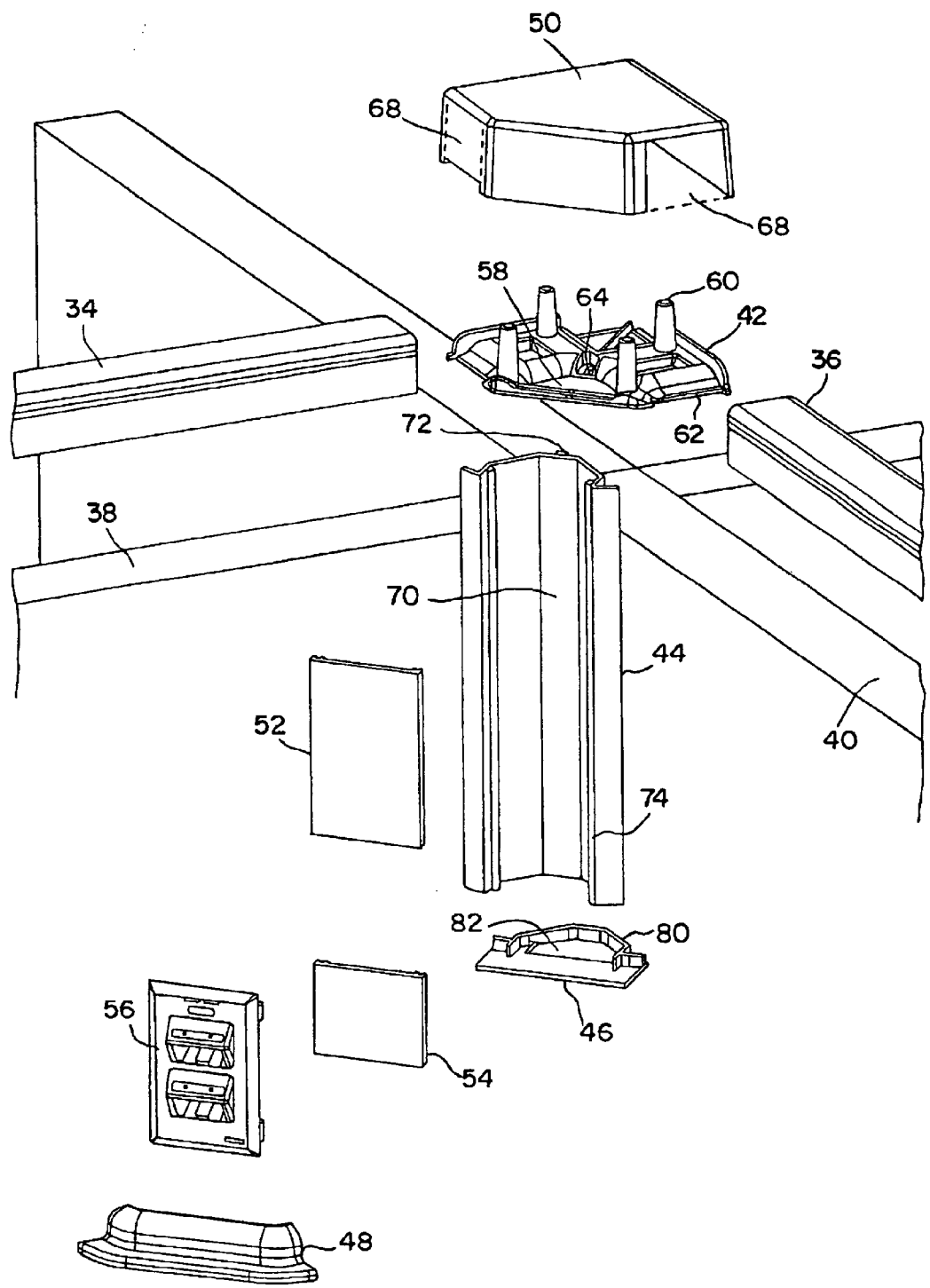
FIG. 2 is a fully exploded perspective view of the raceway system of FIG. 1.

As shown in FIG. 2, raceway system 30 includes an end cap assembly comprising a bottom support 46 (FIGS. 2C and D) and an end cap 48 (FIG. 2E), a corner raceway section 44 securable to bottom support 46, a base cap 42 securable to corner raceway section 44, a base cover 50 securable to base cap 42, horizontal raceway sections 34, 36 securable within base cap 42, raceway covers 52, 54, and a faceplate 56.

Figure 9:
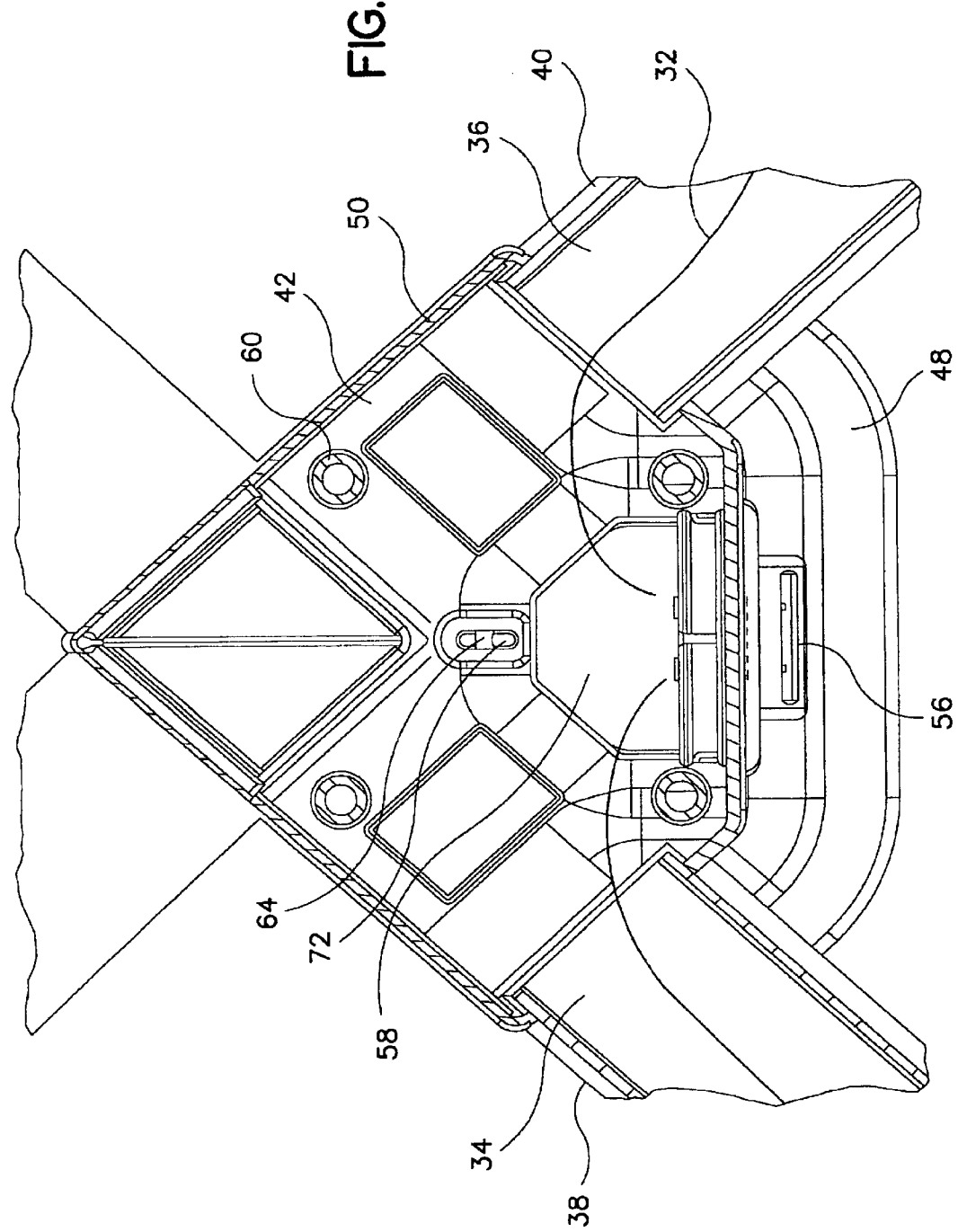
FIG. 9 is a cross-sectional view taken along lines 9—9 of FIG. 5.

As shown in FIGS. 2, 3 and 4, base cap 42 is mounted to the top surface of office furniture panels 38, 40 via two-sided pressure sensitive tape. It is likewise contemplated that other means may be utilized to secure base cap 42 to the top surface of office furniture panels 38, 40. As best seen in FIGS. 3, 4 and 9, base cap 42 includes an aperture 58 for wires 32 to pass vertically therethrough. Base cap 42 allows for ramping of wires 32 for bend radius protection when falling through aperture 58. Moreover, as best seen in FIG. 2A, base cap 42 has four posts, such as post 60, to give stability to base cover 50 when secured to base cap 42, and to control wires 32 as they drop into corner raceway section 44.

Figure 2A:
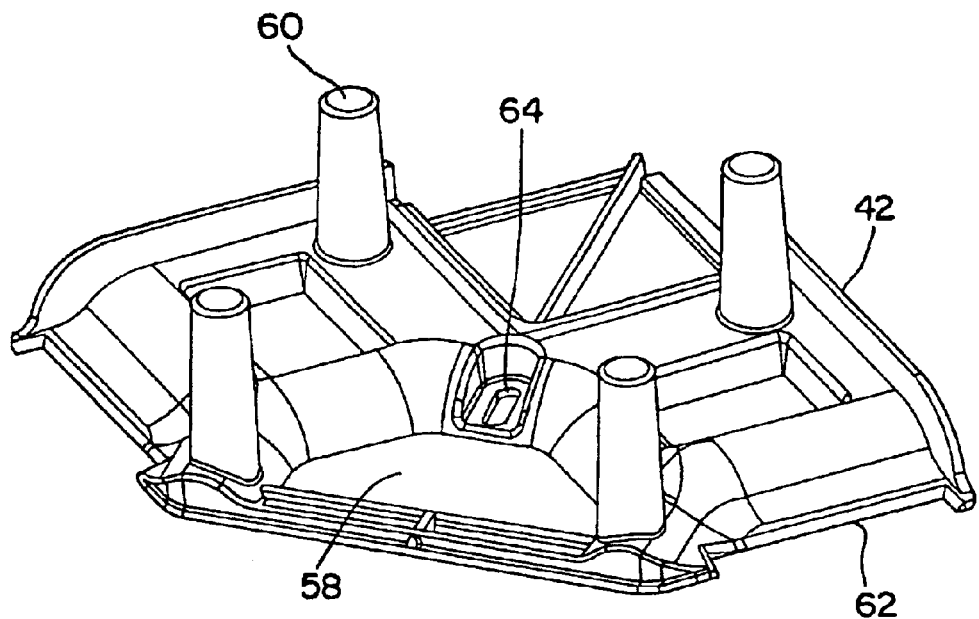
FIG. 2A is a top perspective view of a base cap utilized in the raceway system of FIG. 1.
Figure 2B:
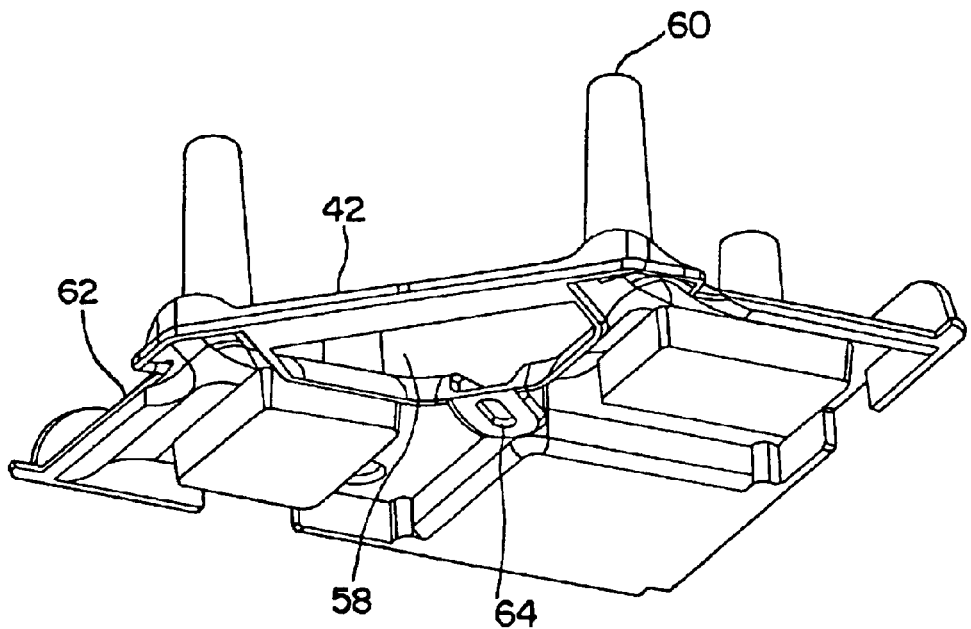
FIG. 2B is a bottom perspective view of the base cap utilized in the raceway system of FIG. 1.

As best seen in FIGS. 2A and 9, base cap 42 has two recessed areas, such as recessed area 62, for positioning horizontal raceway sections 34, 36 therein. Each of the recessed areas 62 allows for the proper alignment of horizontal raceway sections 34, 36 to base cap 42. As best seen in FIG. 1, horizontal raceway sections 34, 36 are mounted to the top surface of office furniture panels 38, 40, respectively, via two-sided pressure sensitive tape. It is likewise contemplated that other means may be utilized to secure horizontal raceway sections 34, 36 to the top surface of office furniture panels 38, 40, respectively.

As best seen in FIG. 9, base cap 42 has a slot 64 for receiving a screw to secure base cap 42 to corner raceway section 44, and allow for adjustment of different width panels. For example, the screw may be secured within slot 64 at a first position to accommodate an office furniture panel having a 1.875 inch width, such as Herman Miller A01 Office Furniture. The screw also may be secured within slot 64 at a second position to accommodate an office furniture panel having a 2.25 inch width, such as Steel Case 9000 Series Office Furniture.

Figure 6:
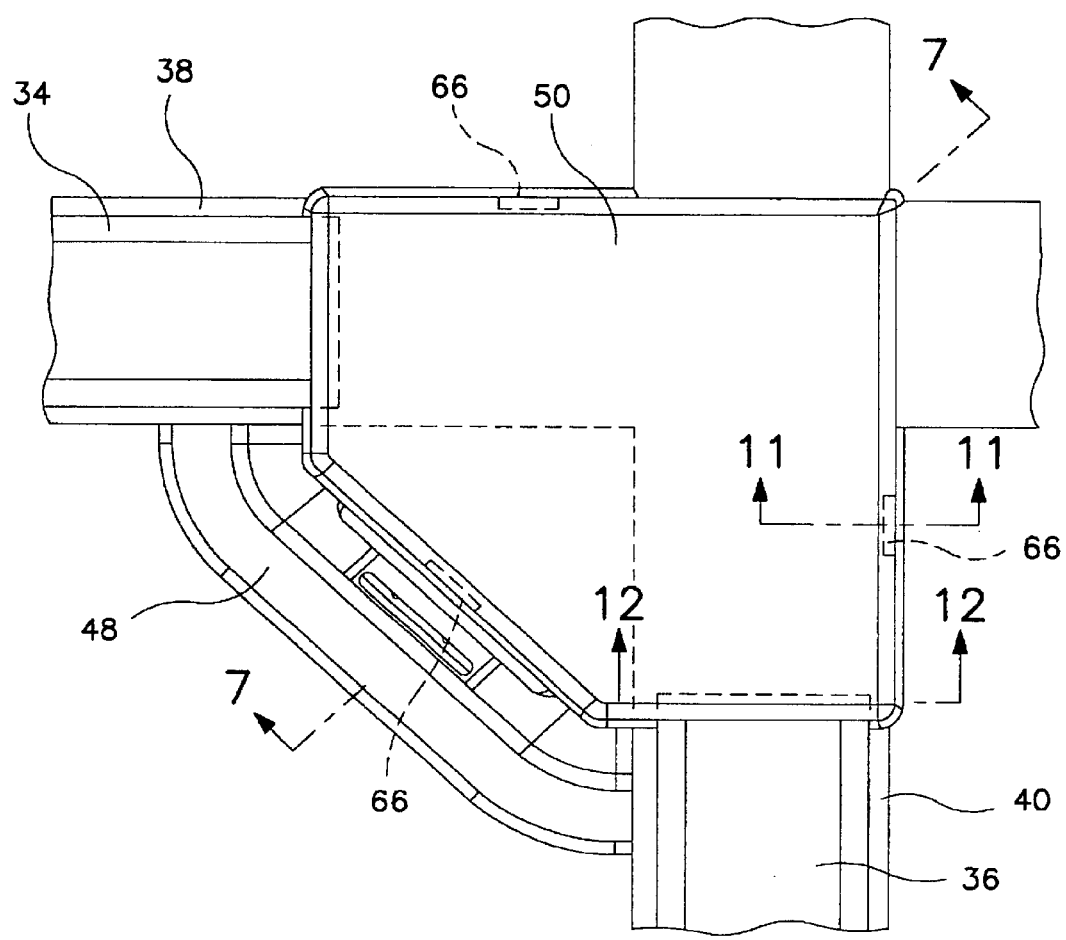
FIG. 6 is an enlarged top view of the raceway system of FIG. 1.
Figure 7:
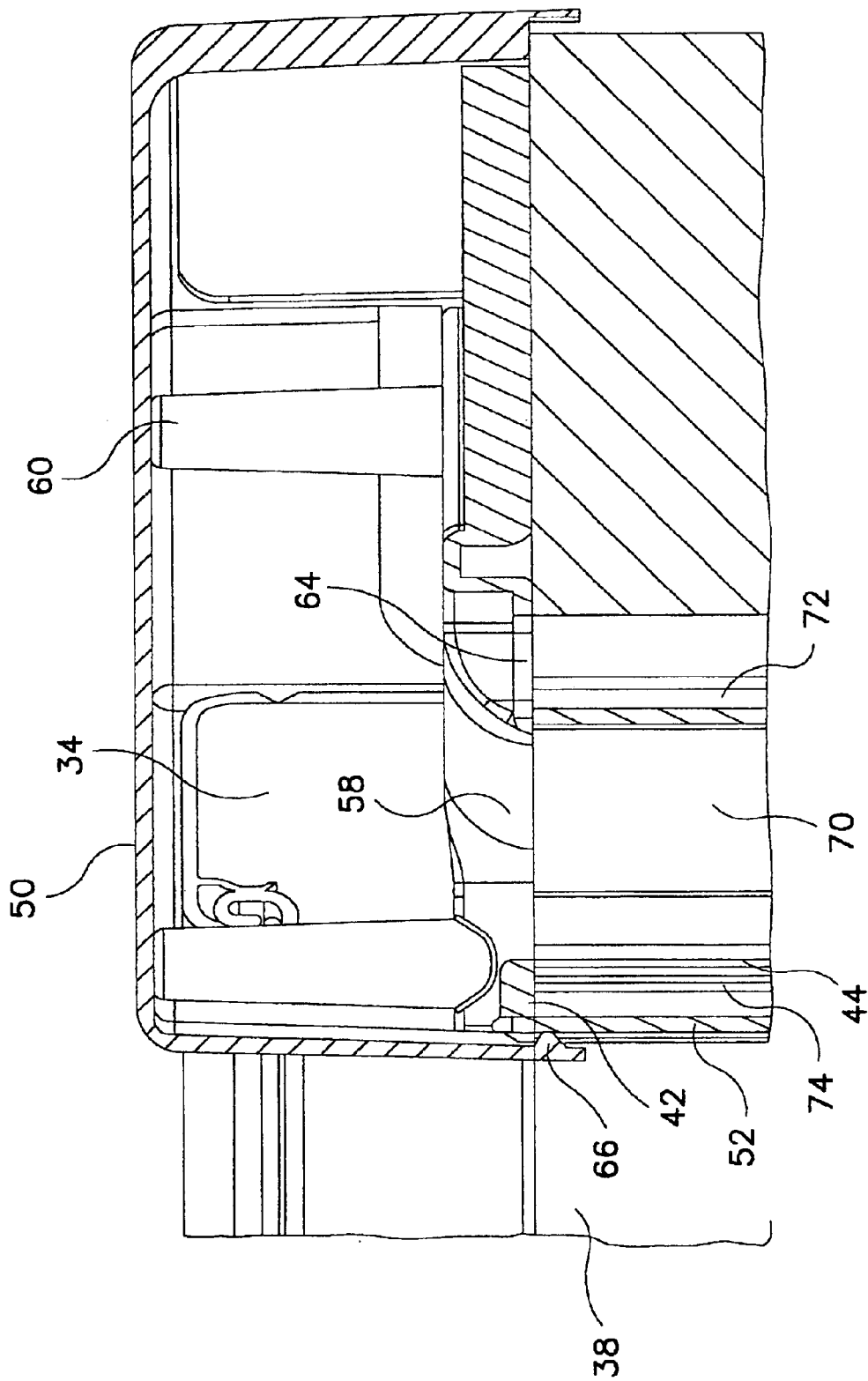
FIG. 7 is a cross-sectional view taken along lines 7—7 of FIG. 6.
Figure 8:
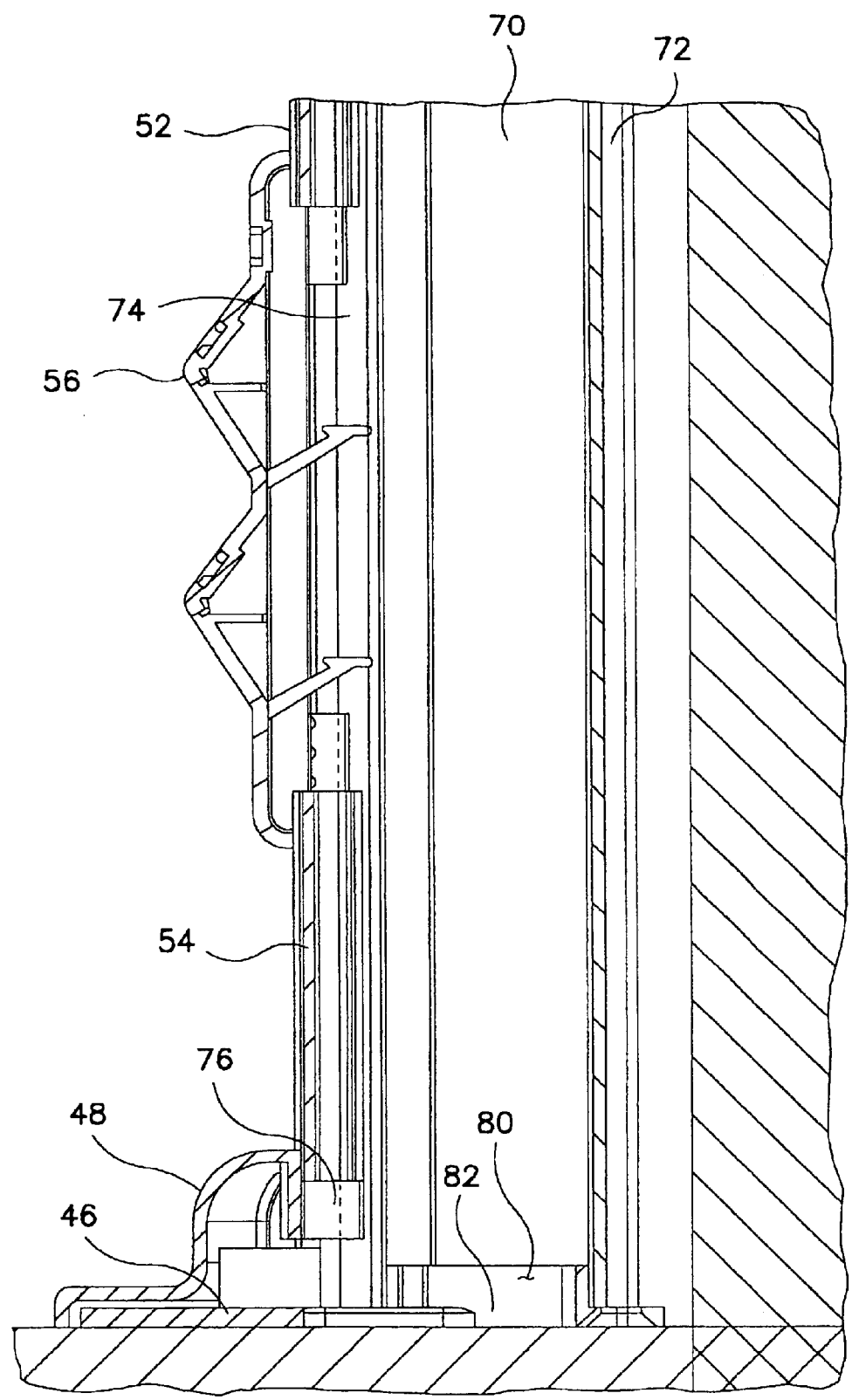
FIG. 8 is a cross-sectional view taken along lines 8—8 of FIG. 5.

As shown in FIG. 6, base cover 50 has three locking tabs, such as locking tab 66, for securing cover 50 to base cap 42. Moreover, as best seen in FIG. 3, cover 50 has four breakouts, such as breakout 68, to allow wires 32 to pass through cover 50 on each of four sides. Preferably, cover 50 overhangs office furniture panels 38, 40 and corner raceway section 44 to hide imperfect cuts on corner raceway section 44.

Figure 10:
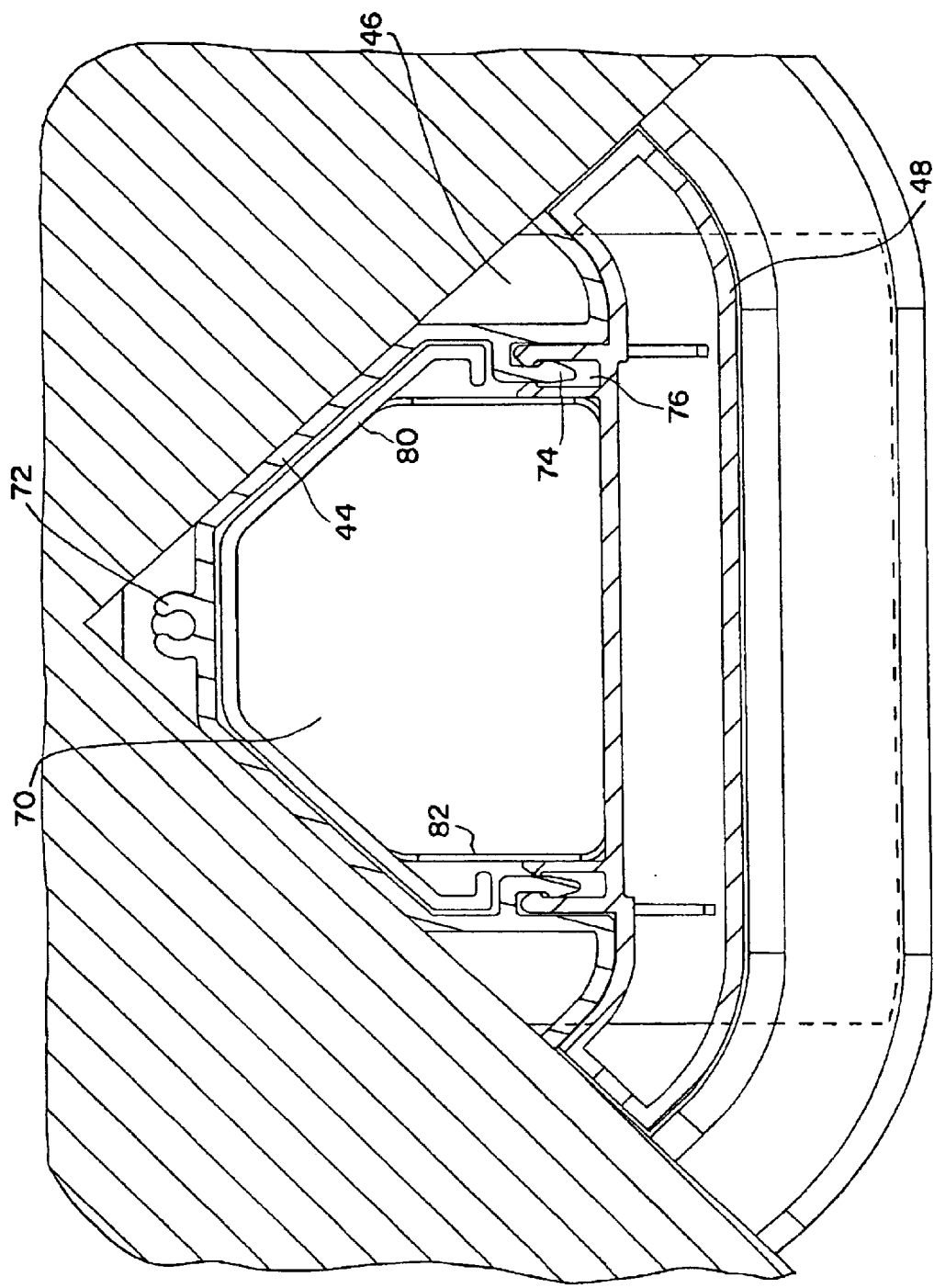
FIG. 10 is a cross-sectional view taken along lines 10—10 of FIG. 5.
Figure 11:
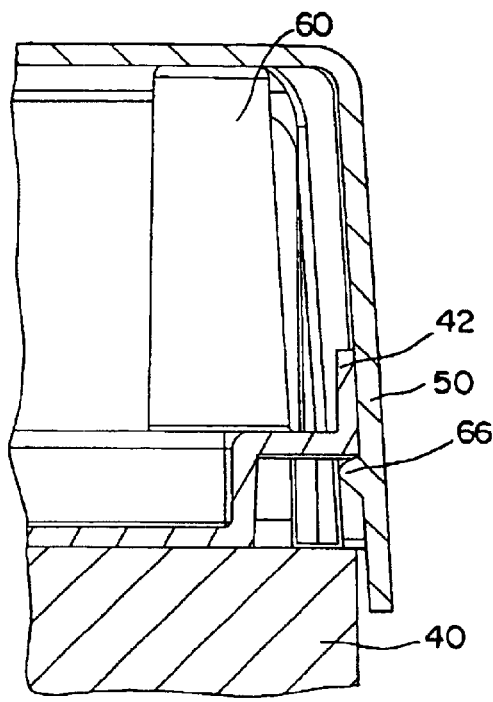
FIG. 11 is a cross-sectional view taken along lines 11—11 of FIG. 6.
Figure 12:
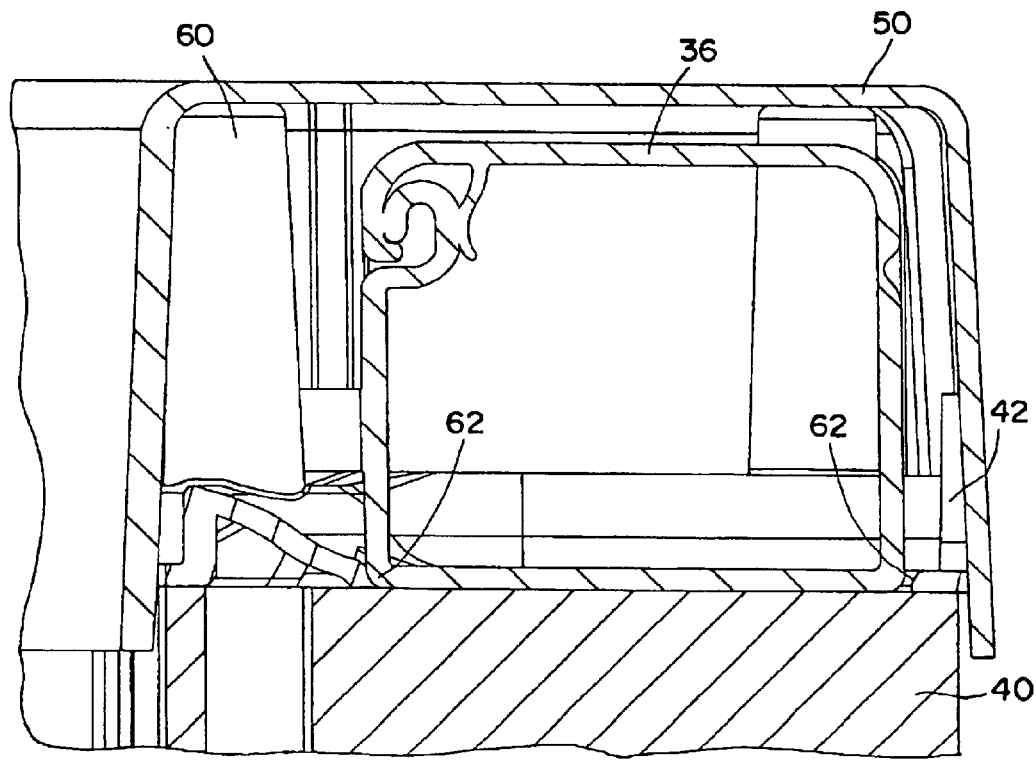
FIG. 12 is a cross-sectional view taken along lines 12—12 of FIG. 6.

As best seen in FIGS. 2, 3 and 4, corner raceway section 44 is positioned in the corner of office furniture panels 38, 40, and rests inside of bottom support 46. Corner raceway section 44 has a channel 70 extending axially therethrough to allow wires 32 to pass vertically through channel 70 to a termination point, such as a connector module in snap-on faceplate 56. Moreover, as best seen in FIG. 10, corner raceway section 44 has a grooved slot 72 for receiving a screw therein to secure base cap 42 to the top of corner raceway section 44. Corner raceway section 44 also has two flanges, such as flange 74, for engaging raceway covers 52, 54, such as Panduit's T-70 cover, or faceplate 56, such as Panduit's T70FV4 sloped, snap-on faceplate.

Figure 2C:
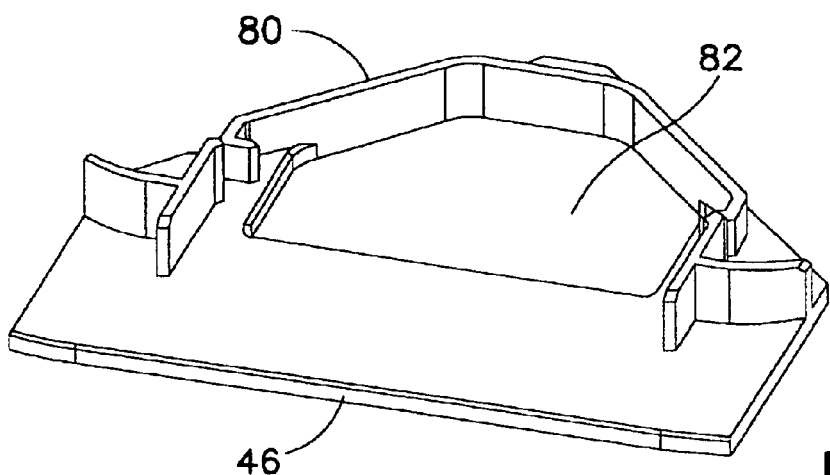
FIG. 2C is a top perspective view of a bottom support utilized in the raceway system of FIG. 1.
Figure 2D:
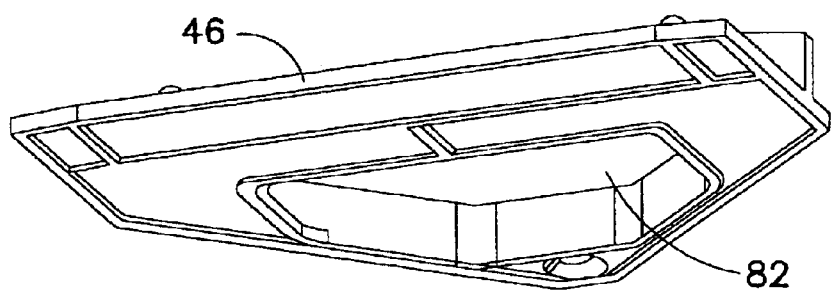
FIG. 2D is a bottom perspective view of the bottom support utilized in the raceway system of FIG. 1.
Figure 2E:
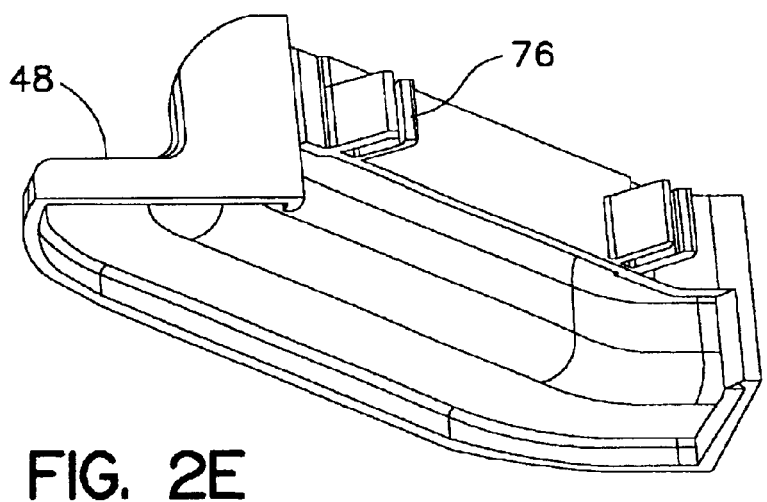
FIG. 2E is a bottom rear perspective view of an end cap utilized in the raceway system of FIG. 1.

As best seen in FIG. 2E, end cap 48 has two retaining slots, such as retaining slot 76, for securing end cap 48 to corner raceway section 44 to hide bottom support 46 and any uneven cuts that may exist on raceway cover 54. As shown in FIG. 3, raceway cover 54 has a breakout 78 to allow wires 32 to pass therethrough after end cap 48 has been secured to bottom support 46. As shown in FIGS. 2C, 3 and 4, bottom support 46 has a plurality of ribs, such as rib 80, for locating and securing corner raceway section 44 therein. Bottom support 46 is mounted to the desk surface via two-sided pressure sensitive tape. It is likewise contemplated that other means may be utilized to secure bottom support 46 to the desk surface.

As best seen in FIG. 3, bottom support 46 has a cut out area 82 to allow wires 32 to pass from the desk level to the floor. Cut out area 82 also allows wires 32 to pass from the floor through corner raceway section 44 to the top of office furniture panels 38, 40, for distribution to other areas in the office environment. Conversely, cut out area 82 allows wires 32 from horizontal raceway sections 34, 36 to pass through corner raceway section 44 to the floor, or to terminate in faceplate 56 in corner raceway section 44.

In operation, corner raceway section 44 is placed inside of the ribs of bottom support 46, and a screw may be utilized to secure bottom support 46 to corner raceway section 44. Bottom support 46 is then retained to the desktop surface in a corner location with two-sided pressure sensitive tape. As best seen in FIGS. 3 and 4, base cap 42 is aligned with the top of corner raceway section 44, and a screw attaches base cap 42 to the top of corner raceway section 44. As shown in FIG. 9, horizontal raceway sections 34, 36 are centered within base cap 42 and attached to the top surface of office furniture panels 38, 40, respectively, via two-sided pressure sensitive tape. As best seen in FIG. 3, wires 32 are routed from horizontal raceway sections 34, 36 through aperture 58 in base cap 42, entering corner raceway section 44 and terminating in connector modules mounted in faceplate 56. Alternatively, wires 32 may pass through cut out area 82 and extend to the floor. Raceway covers 52, 54 and faceplate 56 are attached to corner raceway section 44, and end cap 48 is secured to corner raceway section 44. Finally, base cover 50 is secured to base cap 42.

Figure 13:
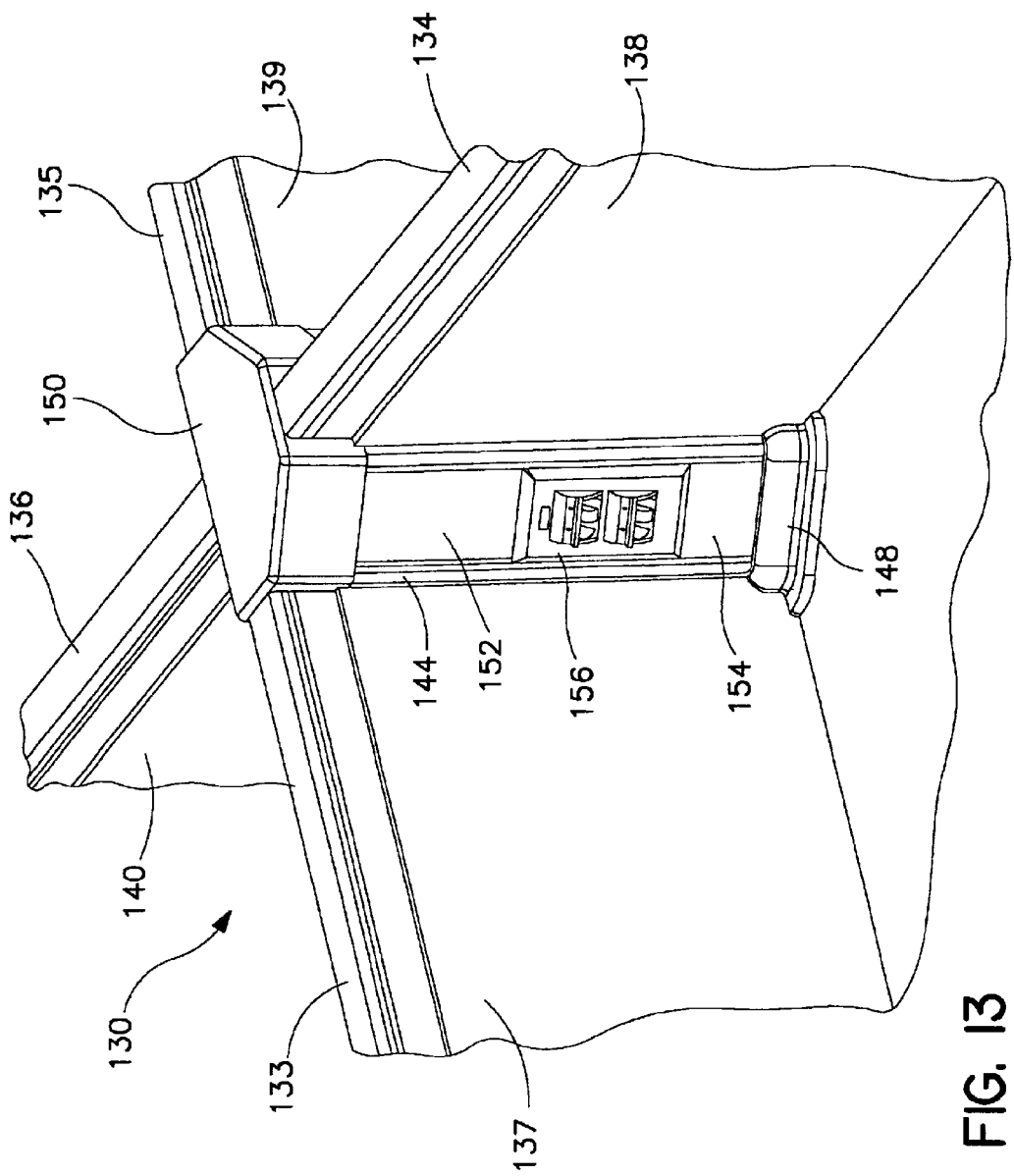
FIG. 13 is a fully assembled perspective view of a raceway system according to a second embodiment of the present invention.
Figure 14:
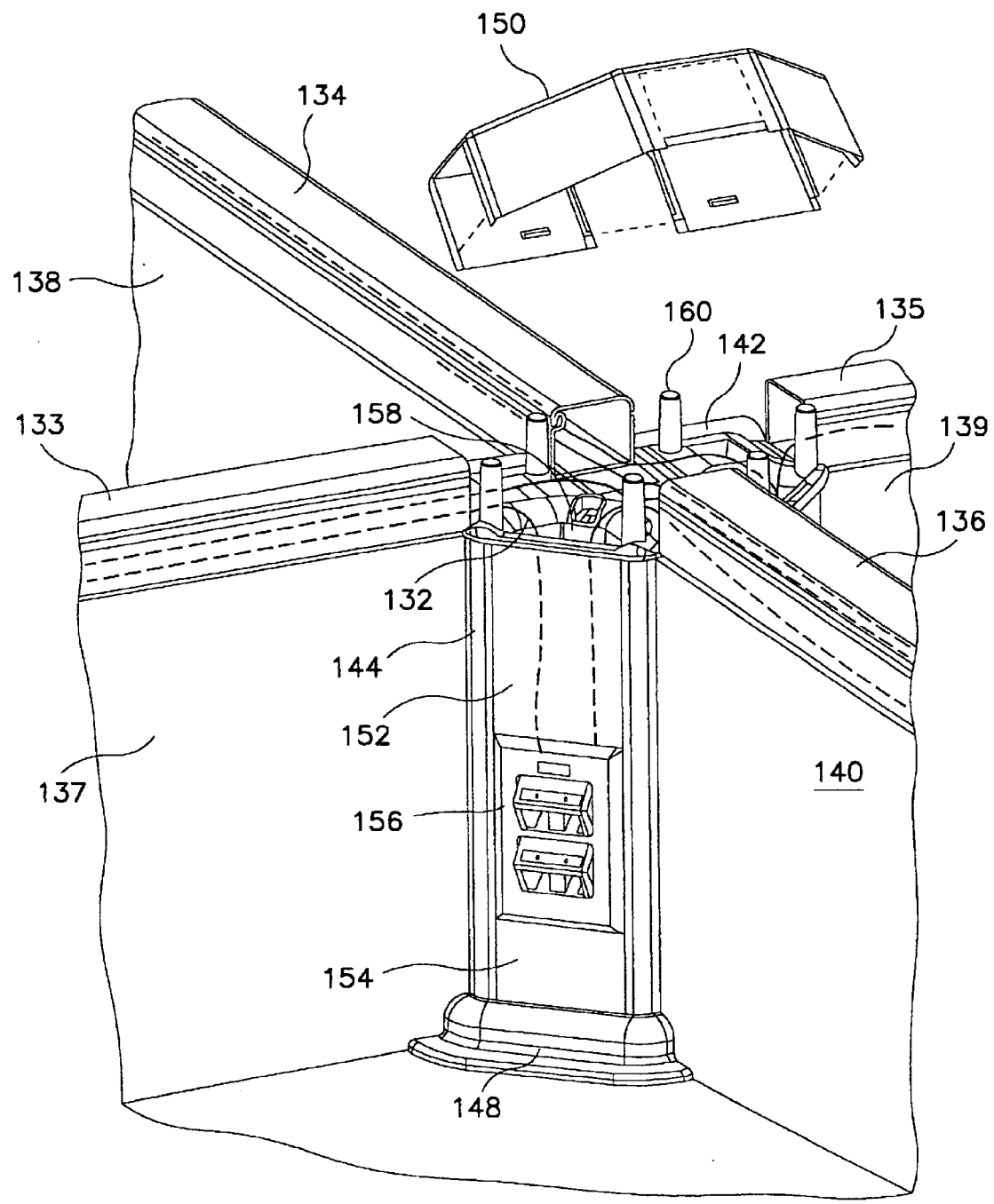
FIG. 14 is a partially exploded perspective view of the raceway system of FIG. 13.
Figure 15:
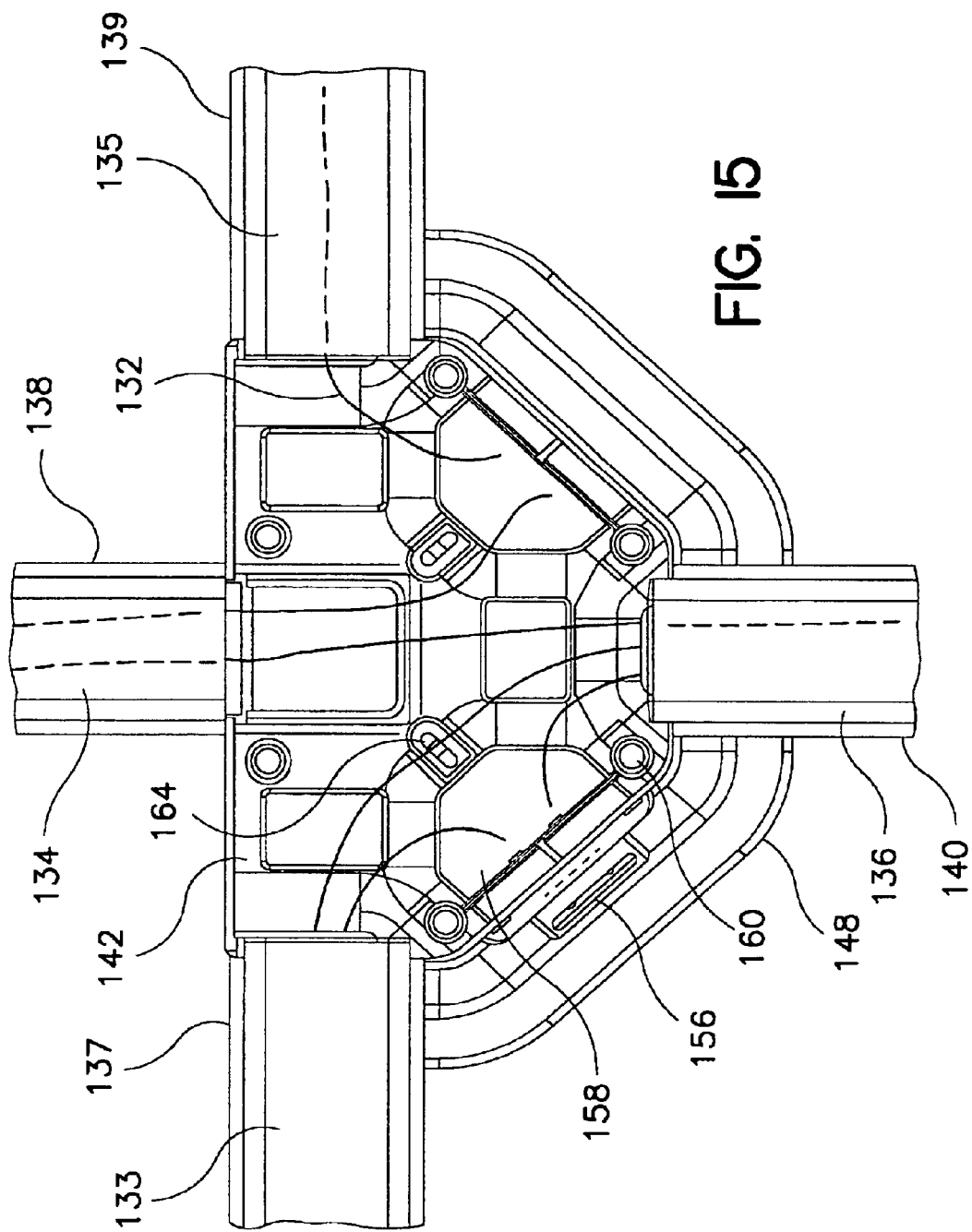
FIG. 15 is an enlarged top view of the raceway system of FIG. 14.

FIG. 13 shows a fully assembled raceway system 130. Raceway system 130 allows communication cabling, such as wires 132, from horizontal raceway sections, such as horizontal raceway sections 133, 134, 135, 136, to spill into the corners of office furniture panels, such as office furniture panels 137, 138, 139, 140. As shown in FIGS. 14 and 15, wires 132 pass vertically through two apertures in a base cap, such as base cap 142, and the channels of two corner raceway sections, such as corner raceway section 144, and terminate at the desk or floor level into connector modules, such as a communication jack. As shown in FIG. 13, wires 132 terminate at the desk level.

Raceway system 130 includes two end cap assemblies, each comprising a bottom support (not shown) and an end cap, such as end cap 148, two corner raceway sections, such as corner raceway section 144, securable to the bottom supports, a base cap 142 (FIGS. 16 and 17) securable to the corner raceway sections 144, a base cover 150 securable to base cap 142, horizontal raceway sections 133, 134, 135, 136 securable within base cap 142, two raceway covers, such as raceway cover 152, two raceway covers, such as raceway cover 154, and two faceplates, such as faceplate 156.

Figure 16:
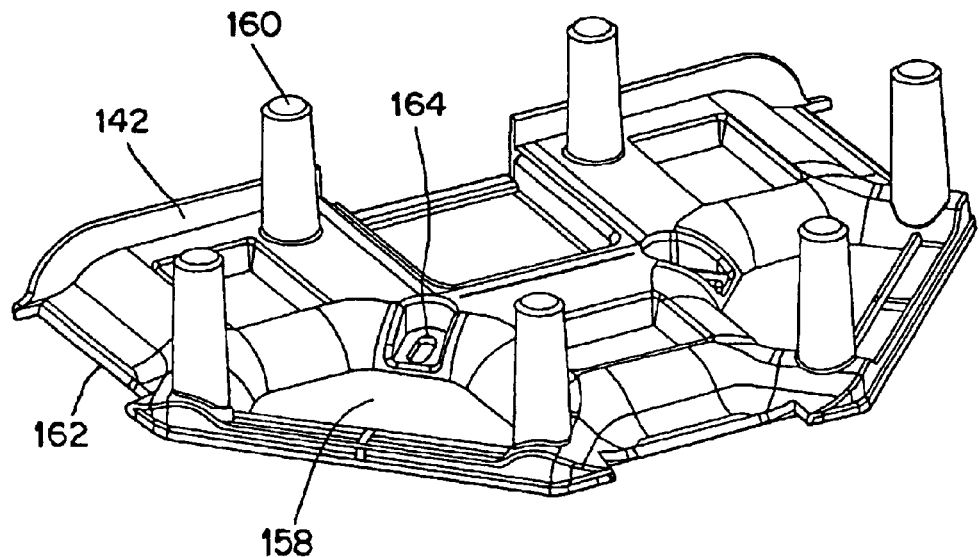
FIG. 16 is a top perspective view of a base cap utilized in the raceway system of FIG. 13.
Figure 17:
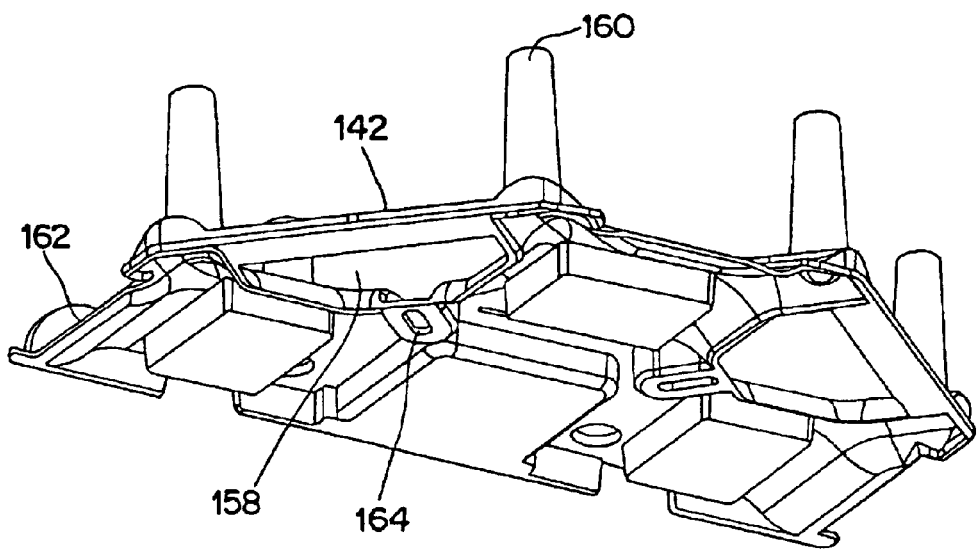
FIG. 17 is a bottom perspective view of the base cap utilized in the raceway system of FIG. 13.

As best seen in FIGS. 15–17, base cap 142 includes two apertures, such as aperture 158, for wires 132 to pass vertically therethrough. Moreover, as best seen in FIG. 16, base cap 142 has six posts, such as post 160, to give stability to base cover 150 when secured to base cap 142, and to control wires 132 as they drop into the corner raceway sections 144. Further, base cap 142 has three recessed areas, such as recessed area 162, for positioning three horizontal raceway sections therein. Base cap 142 also has two slots, such as slot 164, for receiving screws to secure base cap 142 to the corner raceway sections 144.

In operation, two corner raceway sections 144 are placed inside of the ribs of two bottom supports, respectively, and screws may be utilized to secure the bottom supports to the corner raceway sections 144. The bottom supports are then retained to the desktop surface in corner locations with two-sided pressure sensitive tape. Base cap 142 is aligned with the tops of the corner raceway sections 144, and two screws attach base cap 142 to the tops of the corner raceway sections 144. Horizontal raceway sections 133, 134, 135, 136 are centered within base cap 142 and attached to the top surface of office furniture panels 137, 138, 139, 140, respectively, via two-sided pressure sensitive tape. As best seen in FIG. 14, wires 132 are routed from horizontal raceway sections 133, 134, 135, 136 through the apertures 158 in base cap 142, entering the corner raceway sections 144 and terminating in connector modules mounted in faceplates 156. Alternatively, wires 132 may pass through cut out areas in the bottom supports and extend to the floor. Two raceway covers 152, two raceway covers 154 and two faceplates 156 are attached to the corner raceway sections 144. Finally, two end caps 148 are secured to the corner raceway sections 144, and base cover 150 is secured to base cap 142.

Figure 18:
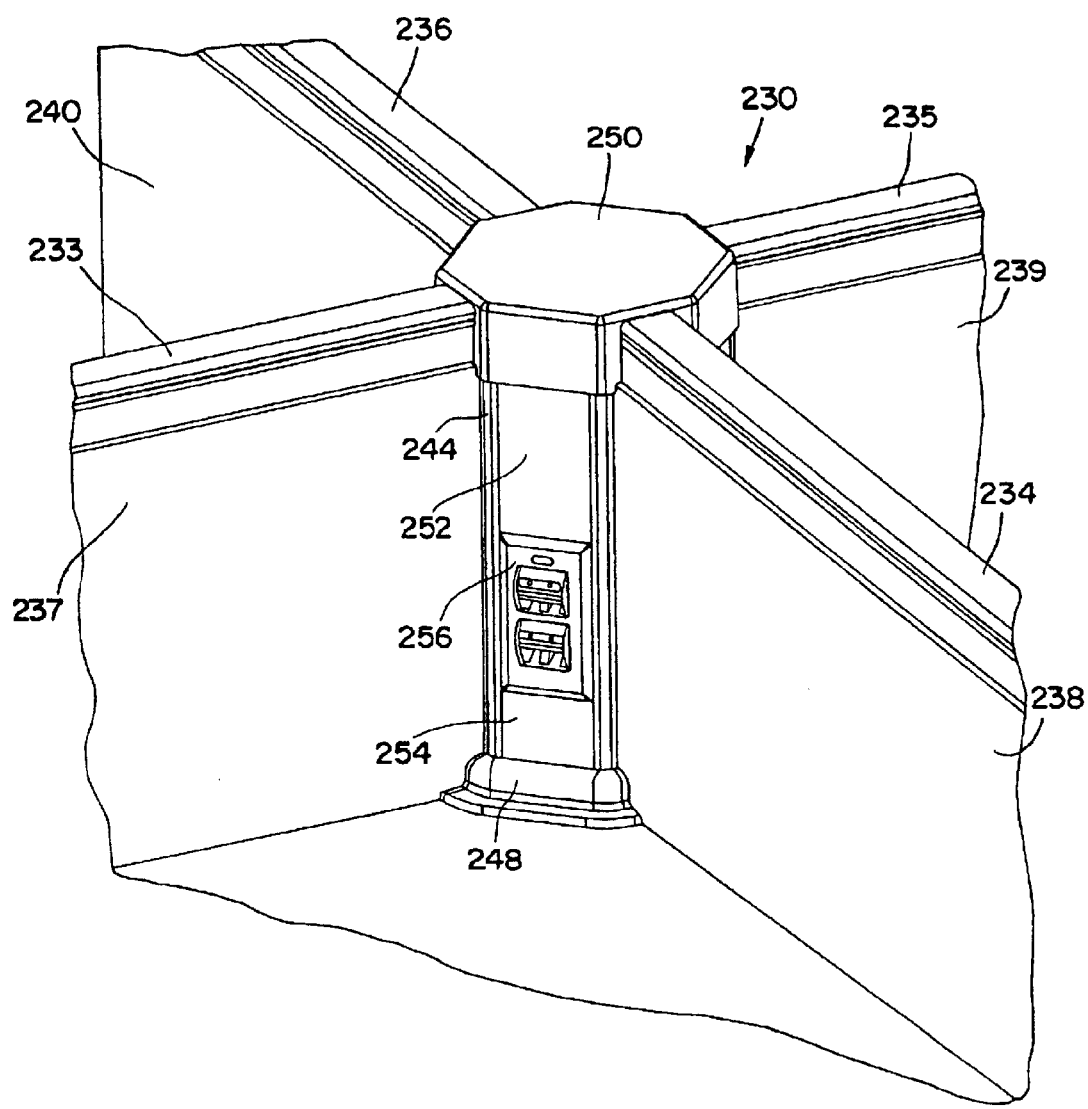
FIG. 18 is a fully assembled perspective view of a raceway system according to a third embodiment of the present invention.
Figure 19:
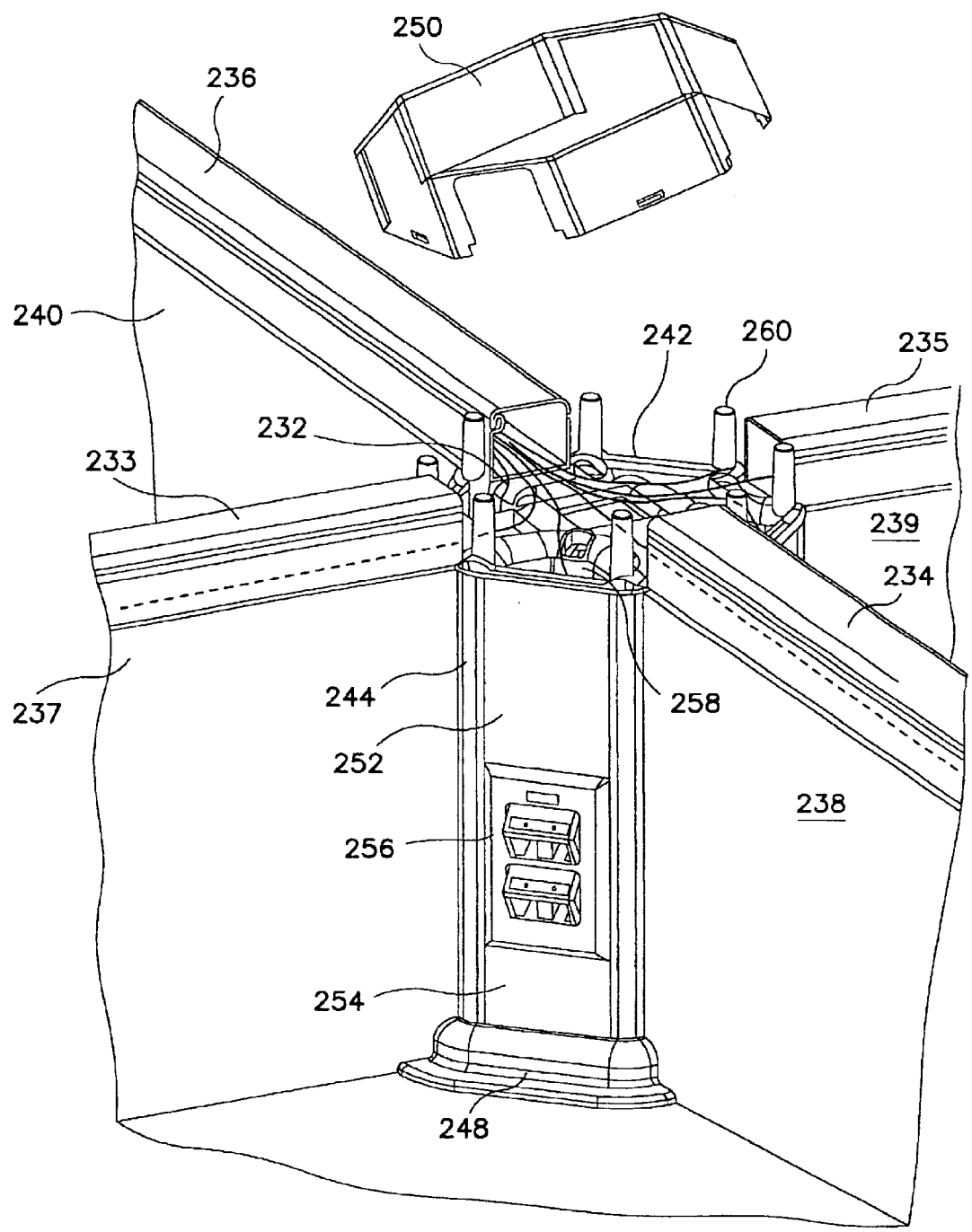
FIG. 19 is a partially exploded perspective view of the raceway system of FIG. 18.
Figure 20:
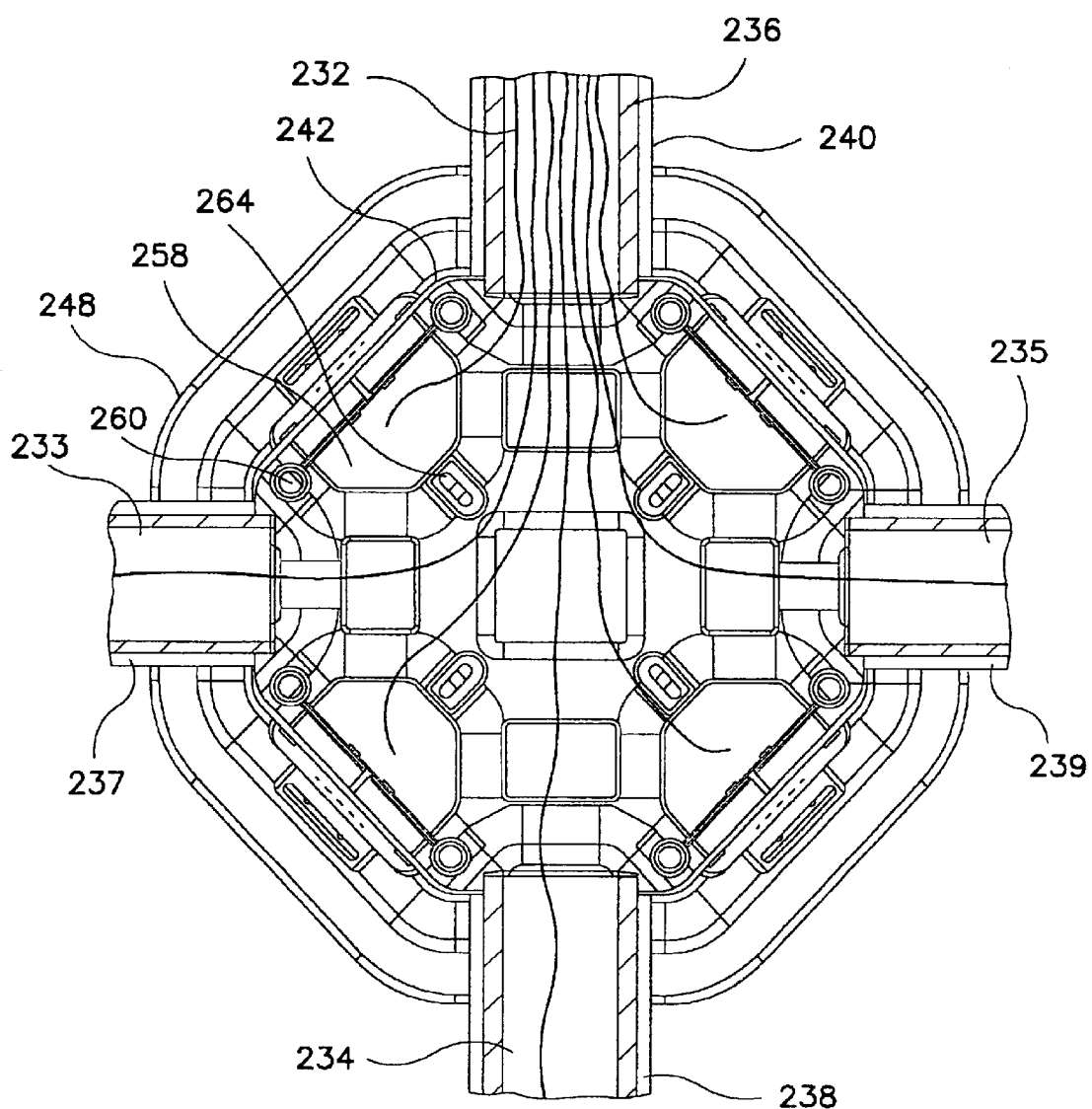
FIG. 20 is an enlarged top view of the raceway system of FIG. 19.

FIG. 18 shows a fully assembled raceway system 230. Raceway system 230 allows communication cabling, such as wires 232, from horizontal raceway sections, such as horizontal raceway sections 233, 234, 235, 236, to spill into the corners of office furniture panels, such as office furniture panels 237, 238, 239, 240. As shown in FIGS. 19 and 20, wires 232 pass vertically through four apertures in a base cap, such as base cap 242, and the channels of four corner raceway sections, such as corner raceway section 244, and terminate at the desk or floor level into connector modules, such as a communication jack. As shown in FIG. 18, wires 232 terminate at the desk level.

Raceway system 230 includes four end cap assemblies, each comprising a bottom support (not shown) and an end cap, such as end cap 248, four corner raceway sections, such as corner raceway section 244, securable to the bottom supports, a base cap 242 (FIGS. 21 and 22) securable to the corner raceway sections 244, a base cover 250 (FIG. 23) securable to base cap 242, horizontal raceway sections 233, 234, 235, 236 securable within base cap 242, four raceway covers, such as raceway cover 252, four raceway covers, such as raceway cover 254, and four faceplates, such as faceplate 256.

Figure 21:
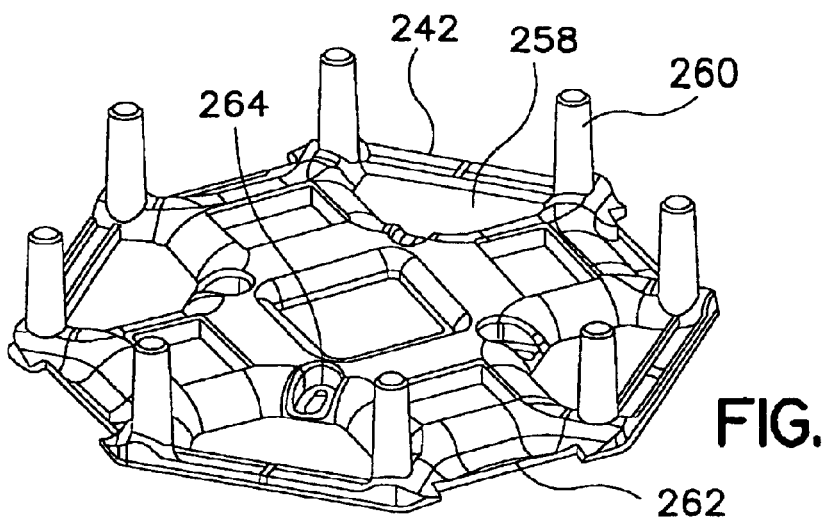
FIG. 21 is a top perspective view of a base cap utilized in the raceway system of FIG. 18.
Figure 22:
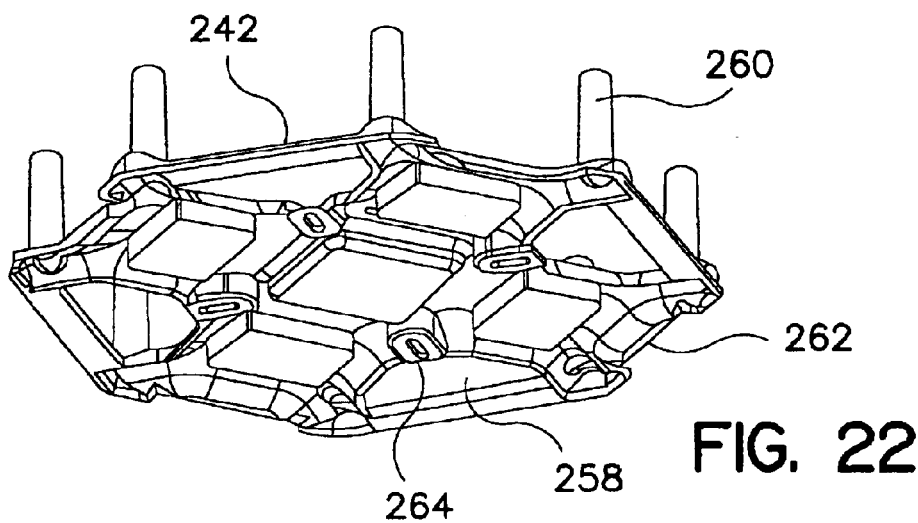
FIG. 22 is a bottom perspective view of the base cap utilized in the raceway system of FIG. 18.
Figure 23:
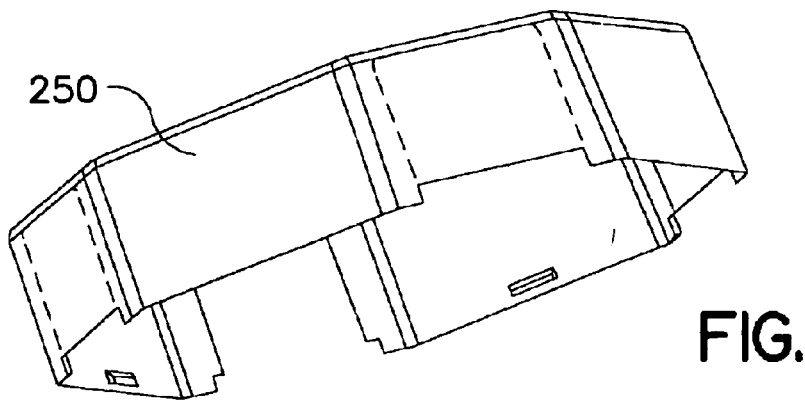
FIG. 23 is a bottom perspective view of a cover utilized in the raceway system of FIG. 18.

As best seen in FIG. 20–22, base cap 242 includes four apertures, such as aperture 258, for wires 232 to pass vertically therethrough. Moreover, as best seen in FIG. 21, base cap 242 has eight posts, such as post 260, to give stability to base cover 250 when secured to base cap 242, and to control wires 232 as they drop into the corner raceway sections 244. Further, base cap 242 has four recessed areas, such as recessed area 262, for positioning four horizontal raceway sections therein. Base cap 242 also has four slots, such as slot 264, for receiving screws to secure base cap 242 to the corner raceway sections 244.

In operation, four corner raceway sections 244 are placed inside of the ribs of four bottom supports, respectively, and screws may be utilized to secure the bottom supports to the corner raceway sections 244. The bottom supports are then retained to the desktop surface in corner locations with two-sided pressure sensitive tape. Base cap 242 is aligned with the tops of the corner raceway sections 244, and four screws attach base cap 242 to the tops of the corner raceway sections 244. Horizontal raceway sections 233, 234, 235, 236 are centered within base cap 242 and attached to the top surface of office furniture panels 237, 238, 239, 240, respectively, via two-sided pressure sensitive tape. As best seen in FIG. 19, wires 232 are routed from horizontal raceway sections 233, 234, 235, 236 through the apertures 258 in base cap 242, entering the corner raceway sections 244 and terminating in connector modules mounted in faceplates 256. Alternatively, wires 232 may pass through cut out areas in the bottom supports and extend to the floor. Four raceway covers 252, four raceway covers 254 and four faceplates 256 are attached to the corner raceway sections 244. Finally, four end caps 248 are secured to the corner raceway sections 244, and base cover 250 is secured to base cap 242.

The disclosed invention provides a raceway system for office furniture. The raceway system includes a base cap having at least one aperture for wires to pass therethrough into a corner raceway section. It should be noted that the above-described and illustrative embodiments and preferred embodiments of the invention are not an exhaustive listing of the forms such a raceway system in accordance with the invention might take; rather, they serve as exemplary and illustrative of embodiments of the invention as presently understood. By way of example, and without limitation, a base cap having three apertures for wires to pass therethrough into three different corner raceway sections is contemplated to be within the scope of the invention. Many other forms of the invention are believed to exist.

What is claimed is:

1. A surface mount box comprising:

a base cap mountable to a top surface of an office furniture panel, the base cap having at least one aperture for wiring to pass vertically therethrough and at least two posts to control the wiring as the wiring passes vertically through the aperture, the at least two posts positioned adjacent the aperture; and a cover securable to the base cap.

2. The surface mount box of claim 1, wherein the base cap has two apertures for wiring to pass vertically therethrough.

3. The surface mount box of claim 1, wherein the base cap has four apertures for wiring to pass vertically therethrough.

4. The surface mount box of claim 1, wherein the base cap has four posts.

5. The surface mount box of claim 1, wherein the base cap has six posts.

6. The surface mount box of claim 1, wherein the base cap has eight posts.

7. The surface mount box of claim 1, including a corner raceway section having a channel extending axially therethrough, the corner raceway section positionable adjacent the base cap to allow the wiring to pass vertically through the aperture and the channel.

8. A raceway system comprising:

a first office furniture panel; a second office furniture panel angularly positioned relative to the first office furniture panel to define an opening therebetween:

a base cap mountable to the first office furniture panel and the second office furniture panel, the base cap having at least one aperture for wiring to pass vertically therethrough, and at least two posts to control the wiring as the wiring passes vertically through the aperture, the at least two posts positioned adjacent the aperture; wherein the aperture is axially aligned with the opening; and a cover securble to the base cap.

9. The raceway system of claim 8, wherein the base cap has two apertures for wiring to pass vertically therethrough.

10. The raceway system of claim 8, wherein the base cap has four apertures for wiring to pass vertically therethrough.

11. The raceway system of claim 8, including a corner raceway section having a channel extending axially therethrough, the corner raceway section positionable adjacent the base cap to allow the wiring to pass vertically through the aperture and the channel.

* * * * *

UNITED STATES PATENT AND TRADEMARK OFFICE
CERTIFICATE OF CORRECTION

PATENT NO. : 6,946,599 B2  
DATED : September 20, 2005  
INVENTOR(S) : Charles VanderVelde It is certified that error appears in the above-identified patent and that said Letters Patent is hereby corrected as shown below:

<u>Title page,</u>  
Item [56], References Cited, insert:  
-- FOREIGN PATENT DOCUMENTS  
GB 2 323 027 A      09/1998 --.

Signed and Sealed this

Fourteenth Day of February, 2006

JON W. DUDAS  
*Director of the United States Patent and Trademark Office*